United States Patent [19]
White et al.

[11] Patent Number: 5,954,222
[45] Date of Patent: Sep. 21, 1999

[54] HOT WATER STORAGE TANK WITH REPLACEABLE LINER

[75] Inventors: Garry Rodney White; Peter John Morris, both of Maddington, Australia

[73] Assignee: Morris White PTY Ltd., Adelaide, Australia

[21] Appl. No.: 08/256,506
[22] PCT Filed: Jan. 15, 1993
[86] PCT No.: PCT/AU93/00013
§ 371 Date: Jul. 14, 1994
§ 102(e) Date: Jul. 14, 1994
[87] PCT Pub. No.: WO93/14356
PCT Pub. Date: Jul. 22, 1993

[30] Foreign Application Priority Data

Jan. 17, 1992 [AU] Australia ............................ PL0453

[51] Int. Cl.⁶ ........................................... B65D 8/04
[52] U.S. Cl. ..................... 220/582; 220/614; 220/622; 220/623
[58] Field of Search .................... 220/581, 582, 220/403, 408, 410, 623, 622, 621, 614, 625, 626, 630, 636, 638

[56] References Cited

U.S. PATENT DOCUMENTS

| | | | |
|---|---|---|---|
| 148,116 | 3/1874 | Green | 220/582 |
| 675,651 | 6/1901 | Delacy | 220/622 |
| 2,483,156 | 9/1949 | Schmitz, Jr. | 220/582 |
| 3,199,712 | 8/1965 | Nurkiewicz | 220/581 |
| 3,228,552 | 1/1966 | Rutledge | 220/621 |
| 3,713,559 | 1/1973 | Thillet | 220/582 |
| 3,874,544 | 4/1975 | Harmon . | |
| 3,917,115 | 11/1975 | Travers . | |
| 3,940,052 | 2/1976 | McHugh . | |
| 4,094,432 | 6/1978 | Zilbert . | |
| 4,465,201 | 8/1984 | Chalfant, Jr. | 220/582 |
| 4,892,227 | 1/1990 | MacLaughlin . | |

FOREIGN PATENT DOCUMENTS

| | | | |
|---|---|---|---|
| 101171 | 6/1937 | Australia . | |
| 207784 | 5/1955 | Australia . | |
| 41608/68 | 2/1971 | Australia . | |
| 27481/77 | 2/1979 | Australia . | |
| 52569/86 | 8/1986 | Australia . | |
| 86720/91 | 6/1992 | Australia . | |
| 0053715 | 6/1982 | European Pat. Off. . | |
| 2574166 | 6/1986 | France . | |
| 2319039 | 10/1974 | Germany . | |
| 2420628 | 12/1974 | Germany . | |
| 2529553 | 1/1976 | Germany . | |
| 3544260 | 6/1987 | Germany . | |
| 18175 | 11/1889 | United Kingdom | 220/622 |
| 1142884 | 2/1969 | United Kingdom . | |
| 1392603 | 4/1975 | United Kingdom . | |

*Primary Examiner*—Stephen J. Castellano
*Attorney, Agent, or Firm*—William R. Hinds

[57] ABSTRACT

A fluid storage tank comprising a main body and covers to close off openings of the main body. The main body and covers have inside surfaces which are, in use, in contact with fluid stored in the tank the main body is made up of a casing and a liner which is provided inside the casing. The covers are releasable retained in place and seal with the inside surface of the main body so that fluid can be stored in the tank.

12 Claims, 5 Drawing Sheets

ABOUT 5,954,222

HOT WATER STORAGE TANK WITH REPLACEABLE LINER

DESCRIPTION

The present invention relates to a fluid storage tank. The fluid storage tank is used to store fluid which is under pressure.

The fluid storage tank of the present invention may be used as the hot water storage tank in a hot water system. The hot water system may, for example, be a solar, gas or electric hot water system. The fluid storage tank of the present invention may be used in other applications in which fluid is stored under pressure in a tank or similar container, eg water filters, fire extinguishes, and gas cylinders.

FIELD OF THE INVENTION

Fluid storage tanks used to store fluid under pressure may deteriorate over time.

In fluid storage tanks used in hot water systems, deterioration generally occurs to the lining inside such tanks which is in contact with the fluid stored in the tank. However, due to the structure of conventional tanks when this deterioration occurs to the lining, the entire tank must be replaced.

In contrast the present invention provides a fluid storage tank in which only the liner needs to be replaced if it deteriorates. In this way the fluid storage tank of the present invention is recyclable or renewable.

The present invention provides a fluid storage tank which may also be used in other applications in which fluid is stored under pressure to provide a fluid storage tank which is recyclable or renewable.

SUMMARY OF THE PRESENT INVENTION

In accordance with one aspect of the present invention there is provided a water heater tank comprising: a cylindrical shell, closed at each of its two ends by a releasable and removable curved end wall concentric with and sealingly engaged within said cylindrical shell wall thereby to enclose an interior volume in which to store hot water; a cylindrical liner, separable from the shell, extending at least substantially between the two ends of the shell and conforming there-through with the inside surface of the shell; an end wall support member adapted to restrain each end wall against movement induced by a force acting upon it as a result of above-atmospheric pressure in the tank interior volume, the end wall support member including both a central portion and a flange portion, the end wall support member central portion being concentric with both the end wall and the cylindrical shell, the end wall support member central portion conforming at least substantially with a surface of a central portion of the end wall facing away from the tank interior volume, while the flange portion extends from the periphery of the end wall support member central portion in a direction both away from the end wall at the other end and parallel to and conforming with the cylindrical shell wall; retention means to retain each end wall support member in juxtaposition with a respective one of the ends of the cylindrical shell, the retention means being cooperative between the flange portion of the end wall support member and a portion of the cylindrical shell wall to which it conforms; wherein each end wall includes (a) a curved end wall center at least substantially conforming with the central portion of a respective cooperative one of the end wall supporting members and (b) a flange, coterminous with the periphery of the end wall center and extending in a direction toward the end wall at the other end of the cylindrical shell wall, the end wall flange having a diameter to fit closely within the cylindrical shell wall and adjacently conforming liner and having sufficient flexibility in a radial outward direction to increasingly compress, in response to increasing internal pressure in the tank, a circumferentially extending seal means cooperative between the end wall flange and the adjacent liner means supported by the cylindrical shell wall.

DESCRIPTION OF THE INVENTION

Figure 1:
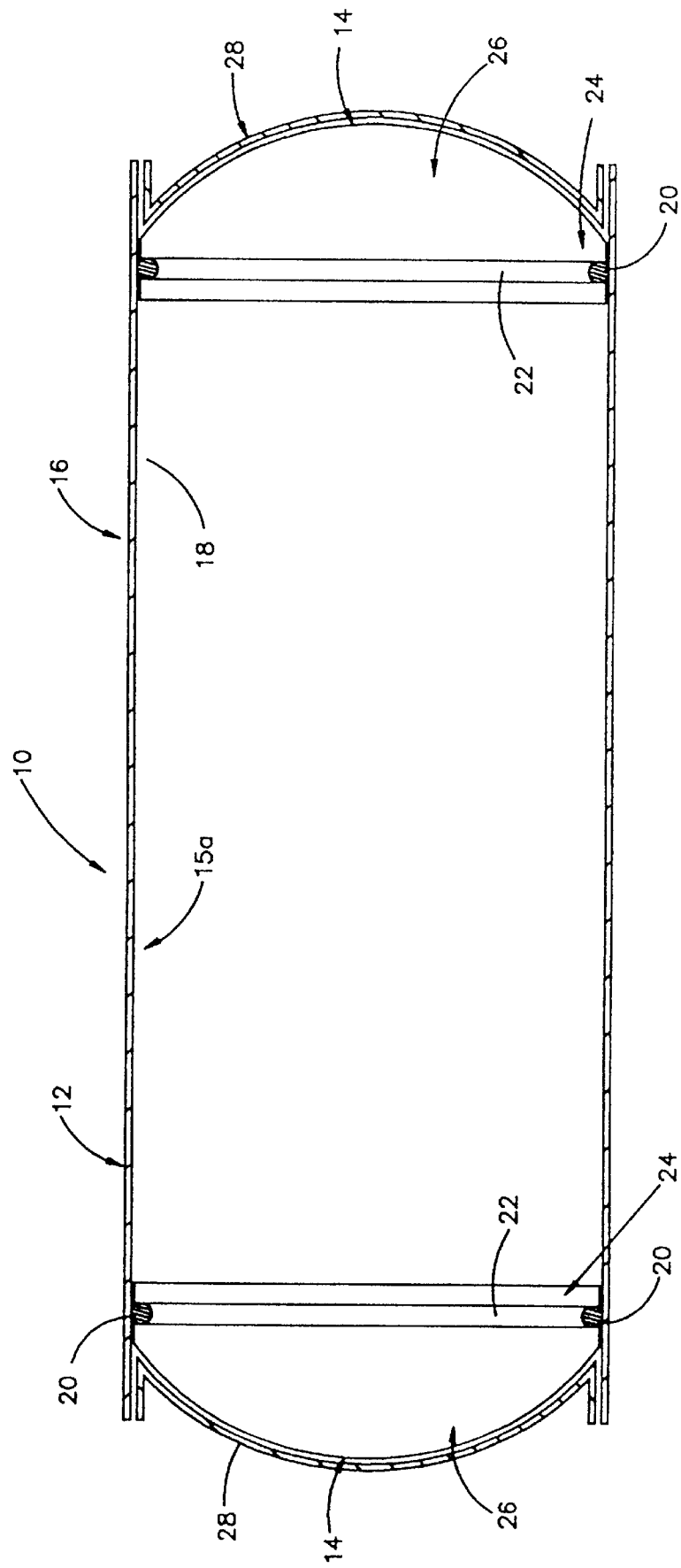
FIG. 1 is a partly cross-sectional elevation view of a first embodiment of a fluid storage tank in accordance with the present invention.

FIGS. 1 to 8 and the description of the preferred embodiments use the same reference numerals to denote the same parts. The description of such parts is not repeated for subsequent embodiments, but it is to be understood that it applies in like manner to such subsequent embodiments.

In FIG. 1 there is shown a fluid storage tank 10 comprising a main body 12 and covers 14 to close off the main body 12 near respective openings thereof. The openings are located at respective ends of the main body 12. The main body 12 has an inside surface 15*a*. The covers 14 each have an inside surface 15*b*. (The inside surfaces 15*b* of the covers 14 cannot be seen in FIGS. 1 to 3 of the first embodiment of the fluid storage tank 10 since the covers 14 are not shown in cross-section in those Figures. However, the inside surface 15*b* of a cover 14' of the first embodiment of the fluid storage tank 60 can be seen in FIG. 7). The inside surfaces 15*a* and 15*b* are, in use, in contact with the fluid stored in the fluid storage tank 10.

The covers 14 seal with the inside surface 15*a* of the main body 12.

The main body 12 is substantially tubular.

The main body 12 comprises a casing 16 and a liner 18. The liner 18 is provided inside the casing 16. The liner 18 is provided adjacent the inside surface of the casing 16. The liner 18 substantially conforms to the inside surface of the casing 16.

Each cover 14 is provided with a seal at its outside surface 19. This seal may be in the form of an O-ring 20 which is positioned in a groove 22 provided on the outside surface 19 of each cover 14. The O-ring seals 20 of the covers 14 seal with the inside surface 15*a* of the main body 12.

The O-ring seals 20 and grooves 22 are provided on respective portions 24 of the covers 14 which lie adjacent the inside surface 15a of the main body 12. The liner 18 extends sufficiently far to the openings of the main body 12 that the O-ring seals 20 of the covers 14 seal with the liner 18 inside the main body 12. In this way the inside surface 15a of the main body 12 is defined by the inside surface of the liner 18. This is Each cover 14 comprises a portion 24 and a dome like portion 26. The portion 24 is drum like, or tubular. Retaining means is provided to retain each cover 14 releasably in position with the main body 12.

The retaining means enable the covers 14 to be releasably retained in position without connecting the covers 14 to the main body 12. The only "interaction" between the main body 12 and the covers 14 is the sealing contact between the O-ring seals 20 and the portions 24 of the covers 14 with the inside surface 15a of the main body 12. This is a pressure induced sealing contact as will be later herein described.

Figure 2:
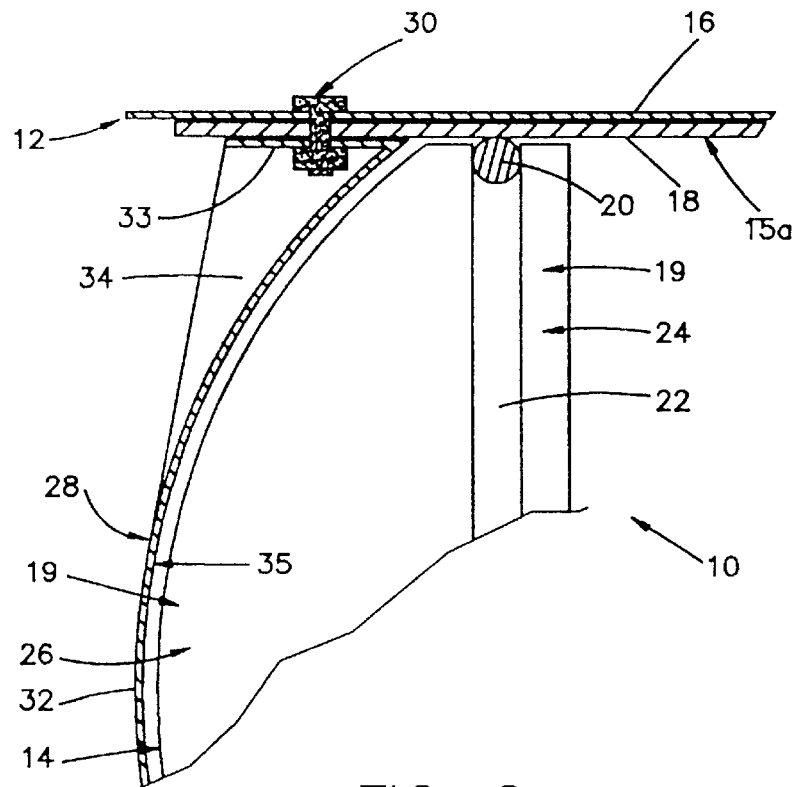
FIG. 2 is a partly cross-sectional elevation view of the cover region of the fluid storage tank shown in FIG. 1.
Figure 3:
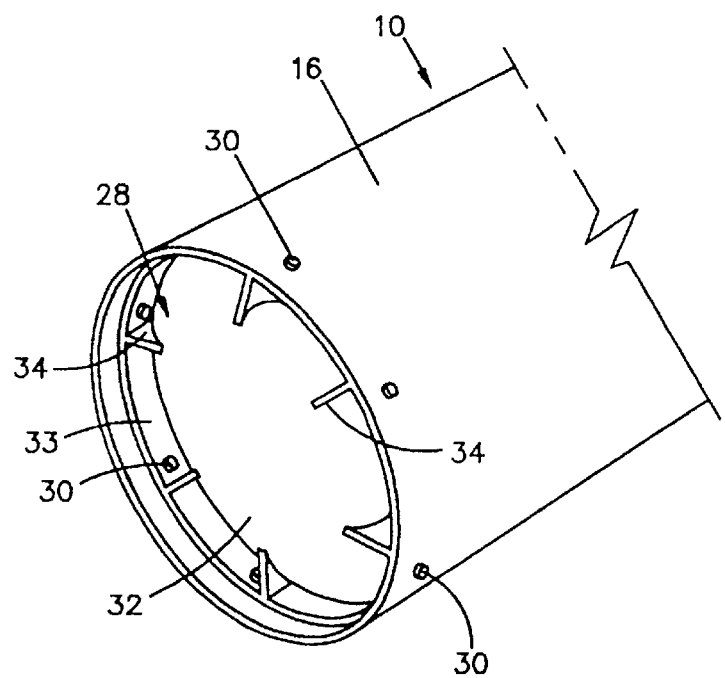
FIG. 3 is a perspective view of the outside of the cover region of the fluid storage tank shown in FIG. 1.

The retaining means is shown in more detail in FIGS. 2 and 3.

In FIGS. 2 and 3, the retaining means is shown as comprising respective cover retention members 28 which are fixedly secured to the main body 12 at respective ends thereof adjacent the covers 14. The cover retention members 28 are fixedly secured to the main body 12 by nuts and bolts shown at 30.

Each cover retention member 28 comprises a plate like portion 32, a peripheral strip like portion 33 and strengthening ribs 34. At least the inside surface 35 of the plate like portion 32 is shaped to conform to the shape of the outer surface 19 of the dome like portion 26 of a cover 14. The plate like portion 32 may itself be dome like. The peripheral strip like portion 33 extends around the periphery of the plate like portion 32 and projects therefrom away from cover 14. The strip like portion 33 conforms with the shape of the inner surface 15a of the main body 12. The strengthening ribs 34 extend between the plate like portion 32 and the peripheral strip like portion 33, at spaced intervals, as best seen in FIG. 3. The bolts 30 pass through the strip like portions 33 and the main body 12 to secure the cover retention members 28 to the main body 12. In FIG. 2 a gap is shown between the outside surface 19 of the dome like portion 26 of the cover 14 and the inside surface 35 of the plate like portion 32. However, this is only for clarity of representation. In practice, no such gap would exist.

Figure 4:
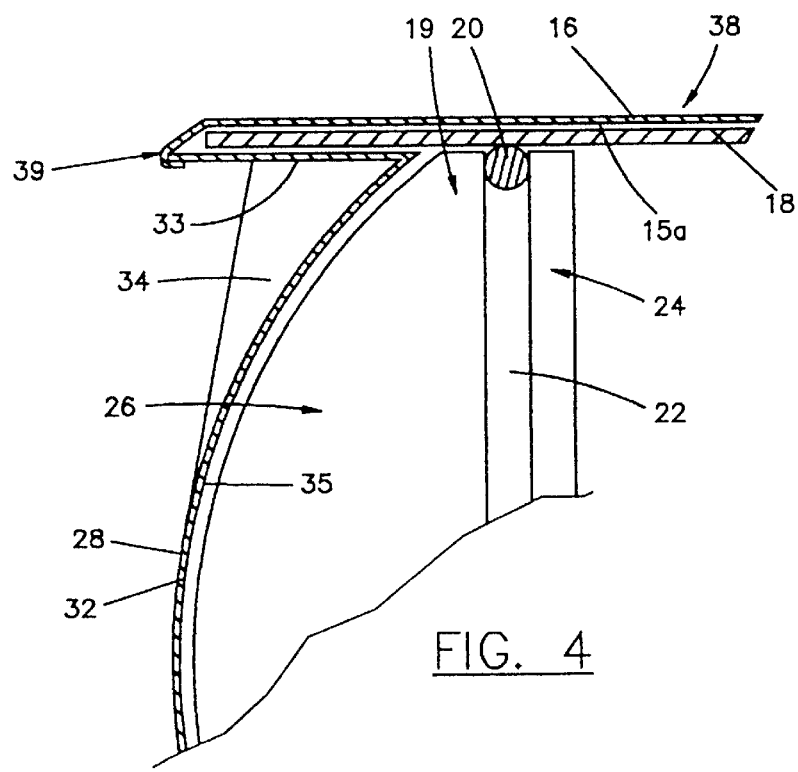
FIG. 4 is a partly cross-sectional elevation view of the cover region of a second embodiment of a fluid storage tank in accordance with the present invention.

FIG. 4 shows a second embodiment of a fluid storage tank 38 in accordance with the present invention. The fluid storage tank 38 is the same as the fluid storage tank 10 of the first embodiment except that it employs an alternative arrangement for securing the cover retention members 28 to the main body 12.

In the fluid storage tank 38, the nuts and bolts 30 are not used. Instead, the end portions of the casing 16 are turned over the edges of the strip like portions 33 of the cover retention members 28 to form a turned lip 39. The cover retention members 28 are in this way fixedly secured to the casing 16 of the main body 12 by a clamping type action of the turned lip 39.

The remainder of the fluid storage tank 38 is the same as the fluid storage tank 10.

Figure 5:
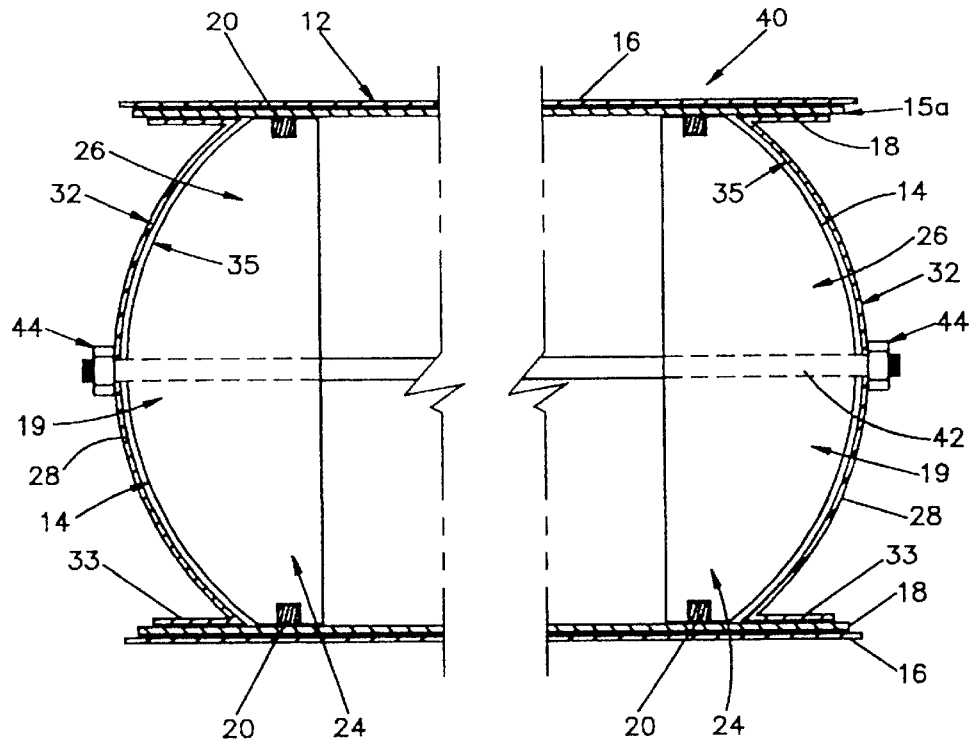
FIG. 5 is a partly cross-sectional elevation view of a third embodiment of a fluid storage tank in accordance with the present invention.

FIG. 5 shows a third embodiment of a fluid storage tank 40 in accordance with the present invention. The fluid storage tank 40 is similar to the fluid storage tank 10 of the first embodiment except that it employs a different arrangement of the retaining means to retain the covers 14 in position.

In the fluid storage tank 40, the retaining means comprises the cover retention members 28 of the fluid storage tank 10, but these are not secured to the main body 12.

Instead, there is provided an elongate bolt 42 which extends through the main body portion 12 between the covers 14. The covers 14 and cover retention members 28 are provided with appropriate holes for the bolt 42 to pass therethrough and nuts 44 are provided outside the tank 40 to keep the bolt 42 in position. The nuts 44 are provided on the outside of each pair of covers 14 and cover retention members 28.

The remainder of the fluid storage tank 40 is the same as the fluid storage tank 10.

Figure 6:
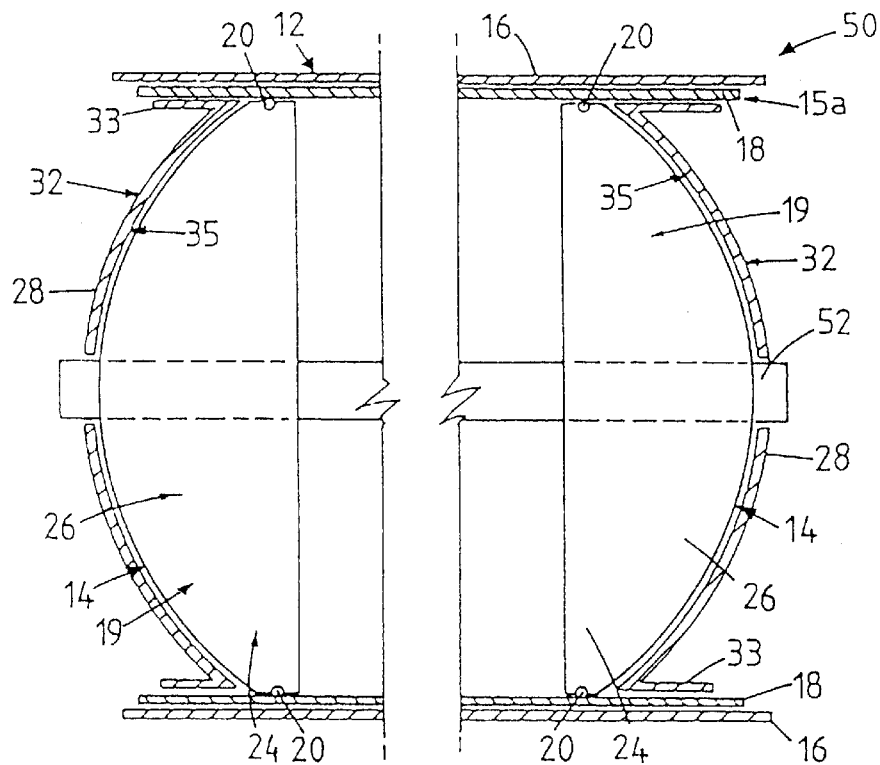
FIG. 6 is a partly cross-sectional elevation view of a fourth embodiment of a fluid storage tank in accordance with the present invention.

FIG. 6 shows a fourth embodiment of a fluid storage tank 50 in accordance with the present invention. The fluid storage tank 50 is similar to the fluid storage tank 10, except that it employs a different arrangement of the retaining means to retain the covers 14 in position.

Once again, the retaining means comprises the cover retention members 28 of the fluid storage tank 10, but these are not secured to the main body 12.

The fluid storage tank 50 is provided with a flue-way 52 extending through the main body 12 between the covers 14. Securing means (not shown) are provided outside the fluid storage tank 50 adjacent the cover retention members 28 in a similar manner to the nuts 44 of the fluid storage tank 40.

Thus, the fluid storage tank 50 is of a similar structure to the fluid storage tank 40, except that the bolt 42 of the fluid storage tank 40 is replaced by a flue-way 52 and the nuts 44 are replaced by an alternative, but analogous, form of securing means. The remainder of the fluid storage tank 60 is the same as the fluid storage tank 10.

Figure 7:
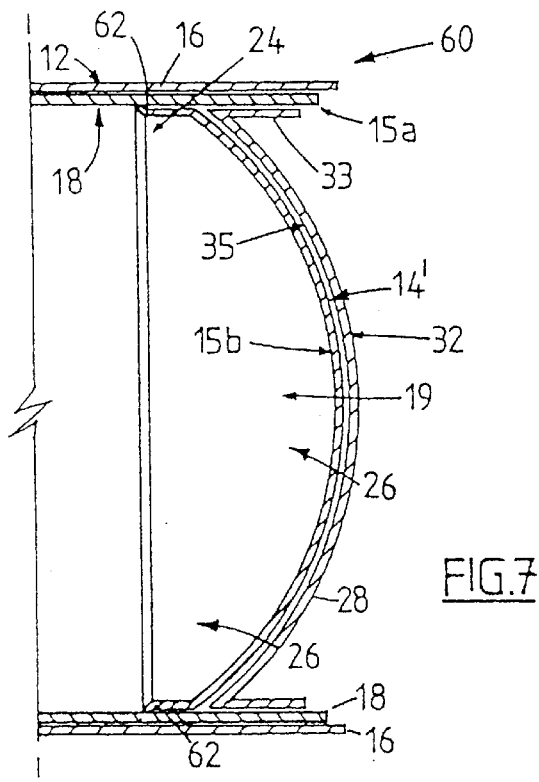
FIG. 7 is a cross-sectional elevation view of the cover region of a fifth embodiment of a fluid storage tank in accordance with the present invention; and, FIG. 8 shows a particular embodiment of the casing and liner of a fluid storage tank in accordance with the present invention.

FIG. 7 shows the cover region of a fifth embodiment of a fluid storage tank 60.

Whilst in FIG. 7 only one end of the fluid storage tank 60 is shown, it will be understood that the other end is of a similar form.

The fluid storage tank 60 is similar to the fluid storage tank 10 except that it employs an alternative sealing arrangement of the covers 14' with the inside surface 15a of the main body 12.

The covers 14' of the fluid storage tank 60 do not use the O-ring seal 20 and groove 22 of the covers 14 of the previously described embodiments.

In the fluid storage tank 60, each cover 14' is formed with an outwardly extending sealing flange or lip like portion 62 at the outside surface 19 at the peripheral edge of the portion 24. This portion 62 is tapered, as can be seen in FIG. 7. The portion 62 seals with the inside surface 15a of the main body 12.

The fluid storage tank 60 may employ retaining means of the same type as any of the fluid storage tanks 10, 38, 40 and 50.

The remainder of the fluid storage tank 60 is the same as the fluid storage tank 10.

In the fluid storage tank of the present invention, the liner 18 may be in the form of a membrane, coating, ceramics material, or a tubular insert which fits into the casing 16.

The liner 18 may be made of material which is non-corrodable since the contents of the fluid storage tank will be in contact with the liner 18. Depending upon the application of the fluid storage tank of the present invention, the liner 18 may need to be made of material which is also high temperature resistant, e.g. when the fluid storage tank is used as the storage tank in a hot water system.

The liner 18 may be made of a plastics polymer. The use of a plastics polymer is particularly suitable when the liner 18 is in the form of a tubular insert.

The covers 14, 14' are also preferably made of a material which is non-corrodable (and high temperature resistant if required) since the contents of the fluid storage tank will also be in contact with the inside surfaces 15b of the covers 14, 14'.

The covers 14, 14' may be made from a plastics material, e.g. plastics polymer.

If the covers 14, 14' are not made from a non-corrodable (and high temperature resistant) material, then their inside surfaces 15b are provided with a non-corrodable (and high temperature resistant) coating or lining. The casing 16 may be made from metal, e.g. steel. The casing 16 surrounds and encloses the liner 18.

Similarly, the cover retention members 28 retain the covers 14, 14' in position. In this way, the casing 16 and the cover retention members 28 support the liner 18 and the covers 14, 14', respectively, and carry the structural stress from the fluid stored by the fluid storage tank of the present invention.

The embodiments of the fluid storage tank that have been described herein incorporate retaining means which comprise cover retention members 28 having plate like portions 32 conforming to the shape of the outer surface 19 of the dome like portions 26 of the covers 14, 14'. It is these plate like portions 32 which carry the structural stress from the fluid pressing against the covers 14, 14'. However, if the covers 14, 14' are made of a material of sufficiently high strength, the cover retention members 28 may be omitted, or modified. Accordingly, in the embodiments shown in FIGS. 5 and 6, the cover retention members 28 may, in such cases, be omitted. In the embodiments shown in FIGS. 1 to 4, the cover retention members 28 may, in such cases, be modified so that the plate like portions 32 are omitted. This then leaves only the strip like portions 33 which are secured to the casing 16 and which are modified to engage with the covers 14, 14'. In this way, the covers 14, 14' will still be retained in position.

Depending upon its application, appropriate holes (not shown) for fittings and the like (not shown) may be provided in the covers 14, 14' and cover retention members 28. In the case of the fluid storage tank being used in a hot water system, such holes accommodate fittings such as the fluid inlet and outlet pipes. The casing 16 may be formed from a strip material which is wound into a helix structure and has its abutting edges butt-welded together.

Figure 8:
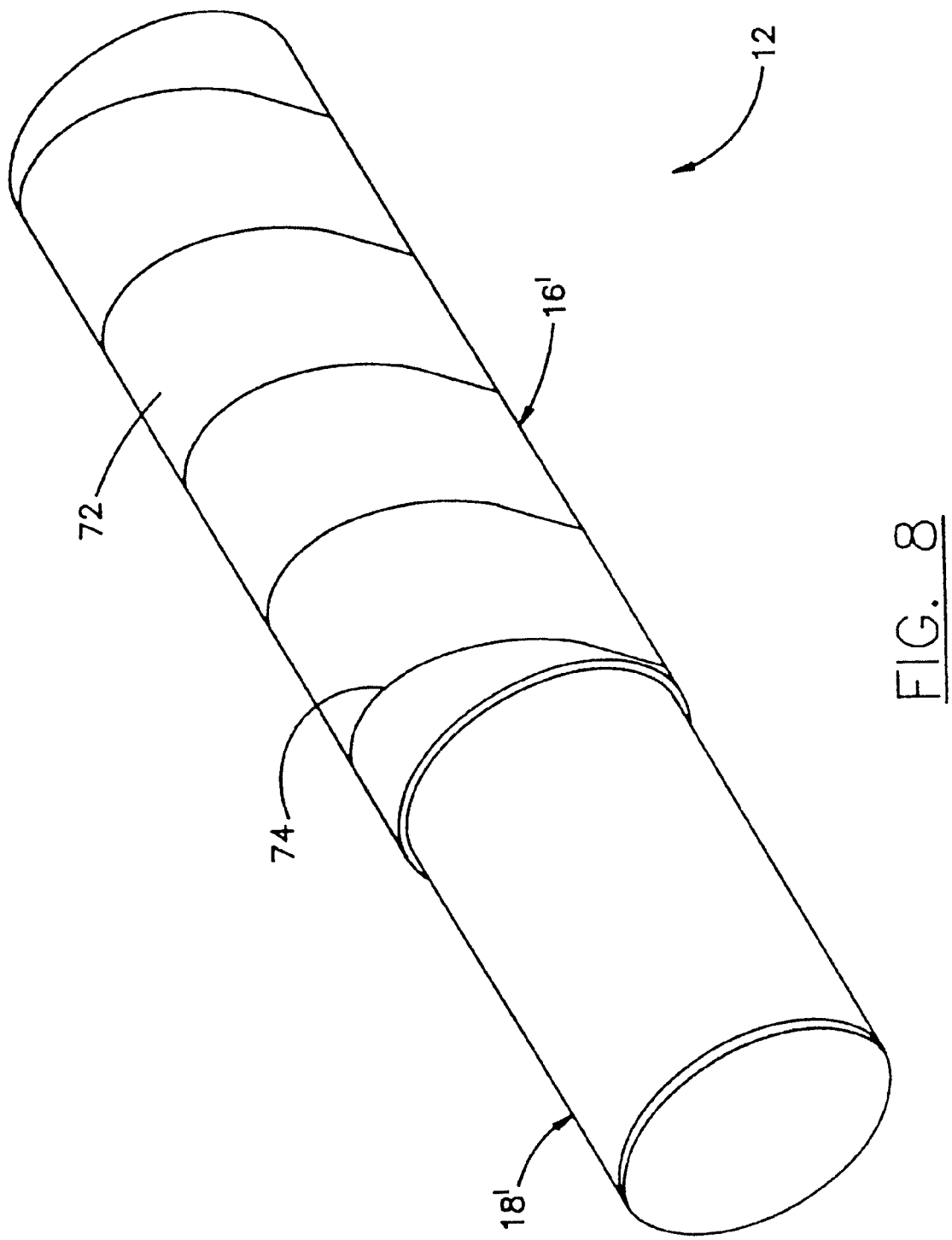

A casing of this type is shown in FIG. 8 and is identified by reference numeral 16'.

The casing 16' is formed from strip material 72 whose butt-welded helical edges are shown by the helical line 74.

A casing 16' formed in this way is particularly suitable when the fluid storage tank is used for a hot water system. However, it may also be used for other applications of the fluid storage tank. The use of a casing 16' in the form shown in FIG. 8 is particularly suitable when the liner 18 is in the form of a tubular insert. This is also shown in FIG. 8. A liner in the form of a tubular insert is identified in FIG. 8 by reference numeral 18'. The liner 18' is fitted into a casing 16' made of strip material 72 and may have an outer diameter that is very slightly greater than the inner diameter of the casing 16' such that the liner 18' cannot readily be inserted into the casing 16. This liner 18' is first placed into a freezer to reduce its temperature. The temperature of the liner 18' is reduced sufficiently such that it shrinks in its radial direction, i.e. the diameter of the liner 18' is reduced. This reduction of its diameter needs to be only a few millimeters. Subjecting the liner 18' to a temperature of minus 20° C. for approximately 24 hours results in sufficient reduction.

After the appropriate time, the liner 18' is removed from the freezer and is then pushed into the casing 16'. This temperature reduction of the liner 18' also results in the liner 18' being inwardly pre-loaded.

As the liner 18' returns to ambient temperature, it expands. In so doing, the outer surface of the liner 18' tightly bears against the inner surface of the casing 16'.

The casing 16, 16' of the present invention carries the structural stress from the fluid contents inside the fluid storage tank. Even in the case of the liner 18 being in the form of a tubular insert, this is also the case.

The fluid storage tank of the present invention is recyclable or renewable. This means that if defects occur in the liner 18, 18' it can be replaced.

This can be done by draining the contents of the fluid storage tank and releasing the retaining means which retains the covers 14, 14' in position. Depending upon the form of the liner 18, 18', the liner 18, 18' can be then removed from the casing 16, 16' and replaced. This is particularly suitably in the case of the liner 18' being in the form of an insert.

If the liner 18 is in the form of a coating, or the like, on the inside surface of the casing 16, 16' then a new coating can be applied or the casing 16, 16' and lining 18 are both removed and replaced as a unit. In another alternative embodiment, the main body 12 may further comprise a (tubular) sleeve (not shown). This sleeve is inserted into the casing 16, 16' to lie adjacent the inside surface of the casing 16, 16'. The liner 18, 18' is then provided adjacent the inside surface of the sleeve.

The sleeve can be used with any form of liner 18, 18' and is particularly suitable when the liner 18 is in the form of a coating or the like.

The sleeve may be made of an insulating material, e.g. urethane.

When the liner 18, 18' becomes defective, the sleeve along with the liner 18, 18' may be removed as a unit from the casing 16 and replaced.

Thus, the form of the main body 12 and releasably retained covers 14,14' (which are not connected to the main body 12) of the fluid storage tank of the present invention allow the fluid storage tank of the present invention to be recyclable or renewable.

Whilst the embodiments of the fluid storage tank of the present invention have been described with reference to particular forms of the sealing arrangement (viz. O-ring seals 20 and flange or lip like portions 62), covers 14 and retaining means of any suitable form may be used. The fluid storage tank of the present invention can be used to store fluid under pressure.

The pressure exerted by the fluid contents of the fluid storage tank of the present invention exerts outwardly directed radial and longitudinal forces on the fluid storage tank.

The longitudinal forces are countered by the retaining means, or covers 14,14'. The retaining means prevent the covers 14,14' from moving in the outward direction, i.e. away from one another. At the same time, the radial forces exerted by the contents of the fluid storage tank push the drum like portions 24 of the covers 14, 14' in a radial direction to bear against the inside surface 15a of the main body 12. This pushes the seal means, e.g. the O-ring seals 20 or the sealing flange or lip like portions 62, into closer contact with the inside surface 15a (ie. the liner 18) of the main body 12 thus providing a stronger seal with increasing pressure of the fluid in the fluid storage tank.

Whilst in the embodiments hereindescribed, the fluid storage tank of the embodiments is shown as having a pair of covers 14, 14' which are releasably positioned to cover a respective opening, it is possible that only one of the covers 14, 14' is releasably retained and the other cover 14, 14' is fixedly retained at one end, i.e. fixed to the main body 12. This may be done by directly connecting the cover 14, 14' to the casing 16, e.g., by a metal strap or by fixedly connecting a securing means of the retaining means to the casing 16.

In the case of the fluid storage tank of the present invention being used in a hot water system, e.g. a solar, gas, or electric hot water system, the fluid storage tank encloses a space which is suitable to contain potable water, e.g. drinking water.

In other applications, the fluid storage tank would store the appropriate fluid, e.g. gas in a gas cylinder application, etc.

Modifications and variations such as would be apparent to a skilled addressee are deemed within the scope of the present invention.

We claim:

1. A water heater tank comprising:
a cylindrical shell, closed at each of its two ends by a releasable and removable curved end wall concentric with and sealingly engaged within said cylindrical shell wall thereby to enclose an interior volume in which to store hot water; a cylindrical liner, separable from said shell, extending at least substantially between said two ends of said shell and conforming therethrough with the inside surface of said shell; an end wall support member adapted to restrain each said end wall against movement induced by a force acting upon it as a result of above-atmospheric pressure in said tank interior volume, said end wall support member including both a central portion and a flange portion, said end wall support member central portion being concentric with both said end wall and said cylindrical shell, said end wall support member central portion conforming at least substantially with a surface of a central portion of said end wall facing away from said tank interior volume, while said flange portion extends from the periphery of said end wall support member central portion in a direction both away from said end wall at the other end and parallel to and conforming with said cylindrical shell wall; retention means to retain each said end wall support member in juxtaposition with a respective one of said ends of said cylindrical shell, said retention means being cooperative between said flange portion of said end wall support member and a portion of said cylindrical shell wall to which it conforms:
wherein each said end wall includes (a) a curved end wall center at least substantially conforming with said central portion of a respective cooperative one of said end wall supporting members and (b) a flange, coterminous with the periphery of said end wall center and extending in a direction toward the end wall at the other end of said cylindrical shell wall, said end wall flange having a diameter to fit closely within said cylindrical shell wall and adjacently conforming liner and having sufficient flexibility in a radial outward direction to increasingly compress, in response to increasing internal pressure in said tank, a circumferentially extending seal means cooperative between said end wall flange and said adjacent liner means supported by said cylindrical shell wall.

2. A water heater tank as claimed in claim 1 in which said seal means comprises a resilient ring interposed between said end wall flange and said liner.

3. A water heater tank as claimed in claim 2 in which said resilient ring is retained in a groove formed around the periphery of said end wall flange.

4. A water heater tank as claimed in claim 1 in which said seal means comprises a radially outwardly protruding, circumferentially extending, ridge integral with said end wall flange adapted to create a seal by locally increasing force induced by internal pressure in said tank around a line of contact between said circumferentially extending ridge and said liner where said ridge and said liner make mutual contact.

5. A water heater tank as claimed in claim 1 in which said retention means is selected from the group consisting of plural removable connections and plural breakable connections between said end support member flange portion and said cylindrical shell wall to enable removal of both said end wall support members and end walls to gain access to said liner for removal thereof from said shell.

6. A water heater tank as claimed in claim 5 having plural removable connections that are reusable for subsequent reassembly of said end support member to said cylindrical shell wall.

7. A water heater tank as claimed in claim 6 in which said removable connections are threaded fasteners circumferentially spaced around said cylindrical shell wall.

8. A water heater tank as claimed in claim 5 having plural breakable connections that can be broken without impairment of said end support member or said cylindrical shell for subsequent reassembly into a water heater tank.

9. A water heater tank as claimed in claim 8 in which said plural breakable connections are spot welds circumferentially spaced around said cylindrical shell wall.

10. A water heater tank as claimed in claim 1 in which said retention means comprises an axial extension of at least one of said ends of said cylindrical shell axially outwardly beyond the flange of said end support member together with a radially inwardly extending structure contiguous with said axial extension being adapted to restrain axially outwardly relative movement between said end support member and said shell in response to internal pressure in said tank.

11. A water heater tank as claimed in claim 10 in which said radially inwardly extending structure means comprises a radially and axially inwardly bent lip adapted to engage circumferentially the free end of said flange portion, said lip formed by bending said axial extension of said end of said cylindrical shell inwardly.

12. A water heater tank as claimed in claim 11 in which said bent lip is adapted to be straightened if required to enable removal of both said end wall support members and said end walls to access said liner for removal thereof from said shell.

* * * * *